United States Patent

[11] 3,555,165

[72] Inventors Kurt L. Ettenhofer;
Francis E. Huff, Hatboro, Pa.
[21] Appl. No. 794,983
[22] Filed Jan. 29, 1969
[45] Patented Jan. 12, 1971
[73] Assignee to the United States of America as represented by the Secretary of the Navy

[54] ACOUSTIC TARGET SIMULATOR
21 Claims, 7 Drawing Figs.
[52] U.S. Cl. ................................................. 35/10.4,
340/5
[51] Int. Cl. .................................................. G09b 9/00,
G01s 9/66
[50] Field of Search ........................................ 35/10, 4;
340/5C, 5D

[56] References Cited
UNITED STATES PATENTS
2,881,535 4/1959 Harwood et al. ............. 35/10.4
3,008,244 11/1961 Lindley ....................... 35/10.4

Primary Examiner—Rodney D. Bennett, Jr.
Assistant Examiner—T. H. Tubbesing
Attorneys—Edgar J. Brower, Henry Hansen and B. Frederick Buchan, Jr.

ABSTRACT: Apparatus for simulating acoustic echoes of sonar pulses from any selected target configuration including a hydrophone whose output signal is fed to a signal processor for modifying a received sonar pulse and generating an electrical echo analogue signal applied to a projector for transmission. The processor includes a modulator for down modulating the carrier frequency of the received pulse and delay devices for delaying the pulse by varying degrees equivalent to the travel times for the pulse between successive major echo producing discontinuities in the target whose echo is being simulated to form a series of pulses. The pulses are controlled in amplitude in accordance with the appropriate target strengths for the succession of discontinuities and are fed to fill-in and summing circuits for adding white noise of desired envelope characteristics in the intervals between successive pulses to form the echo analogue signal. A second modulator shifts the frequency band of the echo analogue signal upwardly and introduces a selected Doppler shift thereinto prior to its application to the projector for acoustic transmission. Feedback elimination circuitry delays and shifts the phase of the echo analogue signal and applies the resulting signal to a summer for eliminating the effect of acoustic feedback.

INVENTORS
KURT L. ETTENHOFER
FRANCIS E. HUFF

ACOUSTIC TARGET SIMULATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention generally relates to sonar apparatus and, more particularly, to apparatus for simulating the echoes returned from acoustic targets of any selected configuration.

Because of the limited availability of actual targets such as ships, submarines, and mines for testing sonar systems or training sonar operators, devices have been devised to simulate energy reflective targets by directing an acoustic echo to the sonar system. Some known simulators respond to sensing sonar pulses exceeding a predetermined threshold level to project an acoustic pulse which is a replica of that transmitted. Other known simulators are of the repeater type which retransmit the received pulse as modified during underwater transmission from the sonar system. Still other known simulators function to elongate the received sonar pulse by continuous transmission of the pulse carrier frequency in order to simulate elongated targets such as submarines having a selected orientation or aspect relative to the sonar system projector. The development of sophisticated sonar systems wherein echo return configurations provide a basis to identify the type of target producing the return has created a need for a simulator which can simulate the complex echo returns from complex shapes such as submarines, mines, and ships.

The echoes provided by targets of complex shape generally do not comprise a single pulse but rather comprise a series of reflected pulses which may or may not overlap and which have variable amplitudes. A. Freedman in his paper "Acoustic Echo Formation" Vol. 12, No. 1, Acoustica, S. Hirzel Verlag, Stuttgart, Germany (1962), pp. 10—21, generally postulates that the shape of the received echo pulse is attributable to the summation of each of the reflections of acoustic energy from the target which are each generated by a discontinuity in the directivity-weighted solid angle subtended at the source transducer by that part of the target within each incremental range or in the derivatives thereof with respect to range.

SUMMARY OF THE INVENTION

Briefly, it is the general purpose of this invention to provide apparatus for simulating the return from an acoustic energy reflective target. The general purpose of this invention may generally be accomplished by providing apparatus including a hydrophone for sensing the incident sonar pulse, processing apparatus including delaying devices and attenuating devices for generating from the input pulse a series of replica pulses separated in time in accordance with the ranges of the succession of major discontinuities of the target to be simulated and attenuated in accordance with relative target strengths to form an echo analogue signal applied to an acoustic projector. Additionally, the invention contemplates the utilization of circuitry introducing white noise in the intervals between successive pulses in the echo analogue signal for providing a more realistic simulation of the desired target. Further, the invention contemplates feedback elimination circuitry for applying a phase shifted duplicate of the projected echo as seen by the hydrophone in order to enable simultaneous reception and transmission by substantially omnidirectional transducers. Still further the invention contemplates the use of a delaying device for adjusting the apparent range of the target and the use of modulators to introduce a Doppler frequency shift into the echo analogue signal for simulating moving targets.

DESCRIPTION OF THE PREFERRED EMBODIMENT

Figure 1:
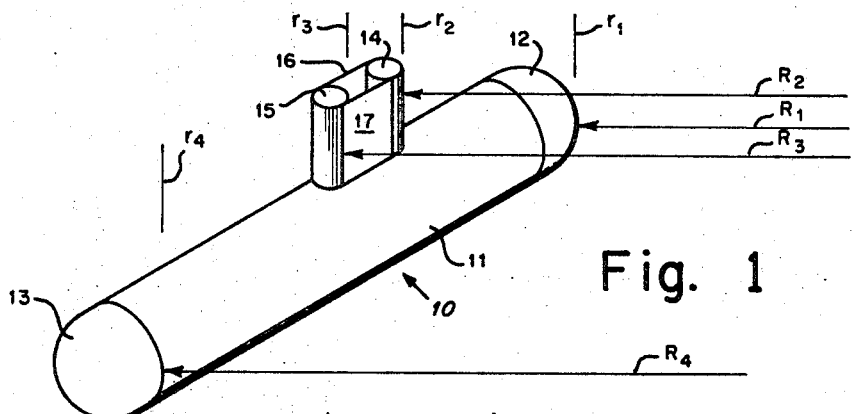
FIG. 1 represents an isometric view of an exemplary acoustic target whose echo return can be simulated according to the invention.
Figure 2:
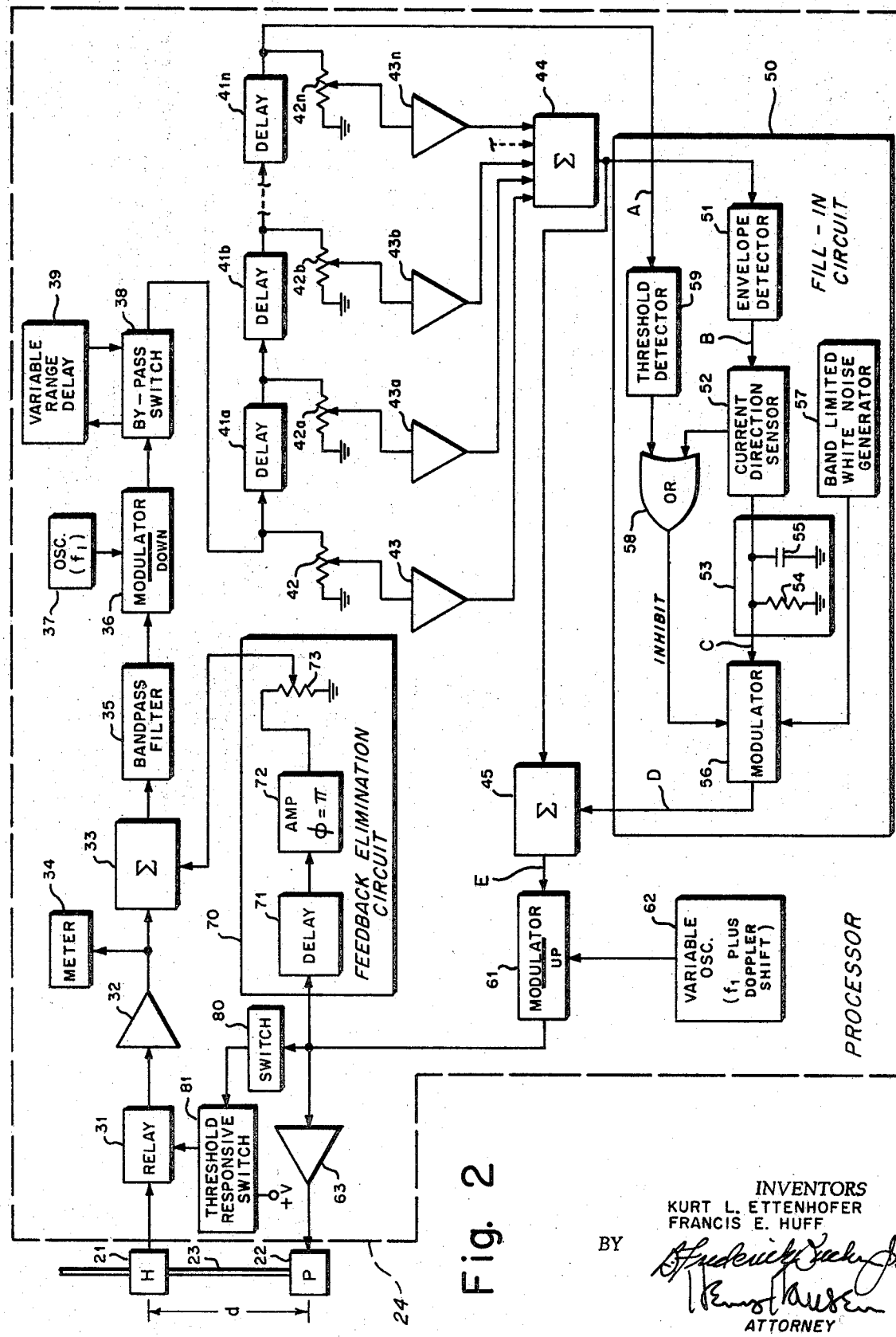
FIG. 2 represents a schematic and block diagram of echo simulating apparatus according to the invention.

A better understanding of the invention may be had by referring to FIG. 1 which discloses an example of a target 10 whose echo can be simulated by apparatus disclosed in FIG. 2. The exemplary target 10 generally has a submarinelike configuration and may be considered as being formed of an elongated cylinder 11 having hemispherical end caps 12 and 13 and generally resembling the target hull. A pair of spaced, parallel cylinders 14 and 15 which protrude orthogonally of the cylinder 11 and which have tangential, flat rectangular plates 16 and 17 interconnecting their lateral peripheries form a configuration generally representing a conning tower.

Generally, let it be assumed that a sonar pulse of duration W and having a constant or varying sonar carrier frequency, as desired, is propagating from the projector of a remotely located sonar system (not shown) generally along the direction indicated by range arrows $R_1$, $R_2$, $R_3$ and $R_4$. In order to simplify the problem, let it be presumed that the sonar system projector is located at a range $r_1$ such that the sonar pulse at the target 10 appears to be generally a planar wave. Of course, the description hereafter to follow may be modified to adjust for cases of nonplanar wave fronts such as spherical. The first portion of the target which will be illuminated by the sonar pulse as at a time $t_1$ will be the end cap at range $r_1$, the water-cap interface being the first reflective discontinuity encountered by the sonar pulse which causes a first major reflection of the sonar pulse. The relative amplitude of the first reflection depends upon the target strength of the cap 12. Subsequent reflections occur for each discontinuity as the projected sonar pulse travels obliquely of the cylinder 11 toward the end cap 13. A second major discontinuity occurs at time $t_2$ when the wave front contacts the leading end of the cylinder 14 at range $r_2$. Reflections of lesser magnitude occur at time $t_3$ and range $r_3$ at the interface between the plate 17 and the cylinder 15 and at time $t_4$ and range $r_4$ at the interface between the cylinder 11 and the end cap 13. The succession of pulse reflections in composite will form the echo from the target 10. Actual echoes have been observed to include other reflections of lesser magnitude thought to be attributable to reflections from rivets and plate seams (not shown) and also from other discontinuities such as the target propeller.

Referring now to FIG. 2, the apparatus includes a hydrophone 21 and a projector 22 mounted on a support cable 23 and spaced apart a distance $d$. Since the hydrophone 21 and projector 22 are positioned at the desired range $r_1$ from the sonar system projector, it is contemplated that the projector 22 may begin transmitting the echo during the interval in which the sonar pulse is being received by the hydrophone 21. The hydrophone 21 and projector 22 have omnidirectional sensitivity patterns to obviate orientation problems. The hydrophone 21 and projector 22 are preferably positioned in spaced relation to the projector of the sonar system at a sufficient range so that the transmitted pulse appears to have a substantially planar wave front.

The electrical output signal of the hydrophone is fed to the signal processor 24 of the apparatus which imposes upon the hydrophone output signal a series of suitable time delays corresponding in duration to the successive times for propagation of the pulse to successive discontinuities in the target to be simulated. Variably delayed samples of the signal, i.e., replica pulses, are collected and attenuated and, if necessary, given a suitable phase shift in order to provide an echo analogue signal to which is further added white noise. The echo analogue signal is applied to the projector 22 for conversion to acoustic energy which has the desired form of the echo from the target being simulated.

More particularly, the output signal from the hydrophone 21 is applied through a normally closed relay 31 to an amplifier 32 whose output signal is applied to a summation circuit 33 conveniently of the high impedance junction type. The hydrophone output signal also is fed to a meter 34 which indicates the amplitude level of the received sonar pulse. The summing circuit 33 also receives a feedback elimination signal, hereinafter more fully explained, and provides an output signal through a band-pass filter 35 to a modulator 36. The modulator 36 receives the output signal of an oscillator 37 having an output frequency $f_1$ of a suitable level so that the modulator 36 provides a replica of the received pulse having a center frequency down-shifted to a suitable level such as 2 kHz. selected to enable the use of desired delaying means. The modulator output signal is applied to a normally closed bypass switch 38 which, when opened, directs the pulse from the modulator 36 through a variable range delay device 39 so that the target whose echo is being simulated may appear to be positioned at a greater range than that at which the hydrophone 21 and projector 22 are positioned. One suitable device for introducing the desired degree of range delay is a tape recorder and tape loop upon which the incoming pulse is recorded and having a length selected in accordance with the desired amount of delay to be introduced. On the succeeding pass of the loop, the recorded pulse will be played back and transmitted through the switch 38.

The hydrophone output pulse, i.e., the processor input signal, which has been down-shifted in center frequency, is normally applied through the normally closed bypass switch 38 to a series of serially connected delay devices 41a, 41b, and 41n. The function of the delay devices 41a—41n is to provide a series of duplicates of the input signal pulse precisely occurring in time in order to approximate the times of occurrence of major reflections from the discontinuities in the target 10. For example, the device 41a imposes a delay selected to correspond to the interval that it takes a sonar pulse to travel from range $r_1$ at the first discontinuity of the target 10 to range $r_2$, the second major discontinuity at the cylinder 14 of the target 10. Similarly, device 41b imposes a delay equal to the pulse travel time from range $r_2$ to the third major discontinuity at range $r_3$. Suitable devices to use are delay devices of the magnetostrictive type which devices are substantially frequency insensitive. For example, such devices may be of the type comprising a helically wound spring having a piezoelectric element at both the inner and outer ends, the input end being pulsed by a carrier frequency signal such as 100 kHz. and the length of the spring determining the magnitude of the delay. In applications where the impinging sonar pulse does not have a swept carrier frequency or a variable frequency, lumped constant, tapped delay lines may be used.

Figure 3A:
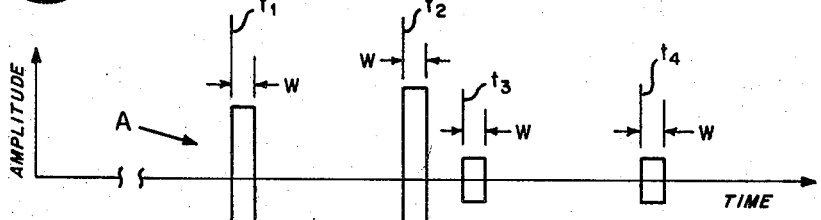
FIGS. 3a, 3b, 3c, 3d and 3e represent time diagrams of various waveform envelopes present in the apparatus of FIG. 2 when simulating the echo from the target of FIG. 1.

The processor input pulse is applied from the switch 38 to a potentiometer 42 whose wiper arm output signal is applied to an amplifier 43. Similarly, the pulse is applied from the output side of each of the delay devices 41a—41n through respective potentiometers 42a—42n to respective amplifiers 43a—43n. The potentiometers 42, 42a, 42b, and 42n are each adjusted so that the relative amplitudes of the output pulses therefrom correspond to those of the major peaks in the echo being simulated. The amplifiers 43, 43a—43n, generally introduce a phase shift of zero radians to the signal passing therethrough since the target being simulated generally may be considered as being a rigid body. However, in the case of simulation of infinitely compressible bodies a phase shift of $\pi$ radians may be introduced by the amplifiers. The output signals from the amplifiers 43, 43a, 43b, and 43n are applied to a summing circuit 44 which may be of the high impedance junction type. The summing circuit 44 provides the electrical echo analogue signal, e.g., waveform A of FIG. 3a, which has a series of precisely positioned pulse replicas having relative amplitudes adjusted in accordance with the relative target strengths of the discontinuities thought producing the reflections approximated by each of the pulses in the signal. It is to be noted that, of course, the processor input pulse may be applied to a series of parallel connected delay devices rather than to the serially connected devices as shown particularly in instances where the pulses are to be repeated at close intervals.

Figure 3B:
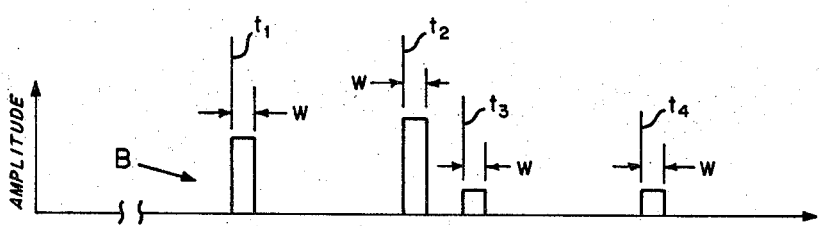

The echo analogue signal is applied from the summing device 44 to a summing device 45 for incorporation of amplitude controlled white noise in the interval between successive pulses in the analogue signal in order to provide a more exact simulation of the echo produced by the target selected. In order to obtain the noise, the echo analogue signal is also applied to a fill-in circuit 50 to an envelope detector 51. The detected DC output signal of the envelope detector, waveform B of FIG. 3b, is applied through a current direction sensor 52 to an R-C exponential decay circuit 53 including a paralleled resistor 54 and capacitor 55. The charge built up over the capacitor 55 is applied to a modulator 56 which receives at its other input white noise from a band limited white noise generator 57.

White noise generators are commercially available and generally provide an output signal having a completely flat spectrum energy characteristic. It is preferred, however, to band limit the noise produced by the generator 57 as by a band-pass filter in order to avoid the introduction of spurious frequency spectra which could be confused with Doppler shifts when the center frequency of the echo analogue signal including the noise is up-shifted to the level of the received sonar pulse as hereinafter follows.

When the capacitor 55 is charging as when one of the input or replica pulse envelopes is being applied thereto, the sensor 52 produces an output signal which is applied through an OR gate 58 to inhibit the modulator 56 from producing an output signal. The output pulse from the last delay device 41n is applied to a threshold detector 59 which, in turn, provides an output signal preferably of a length of about 1 ⅓ times the processor input pulse width.

Figure 3C:
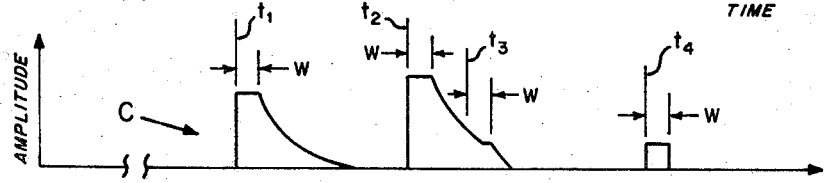

In general, the output of the R-C decay circuit 53, waveform C of FIG. 3c, is utilized to amplitude modulate the white noise provided by the generator 57. Referring now to FIG. 3, each pulse from detector 51 experiences an exponential decay set by the time constant of the R-C circuit 53. The appropriate time constant is most easily selected by trial and error. For example, using photographs of actual echoes returned from the target having a particular aspect which is being simulated, an average time constant is selected to fit the echo envelope extending from the trailing ends of major peaks. In the event of a great disparity in the slopes of the envelope, the apparatus of FIG. 2 may be modified as by including a fill-in circuit 50 in each channel, i.e., receiving the output signals of a respective one of the amplifiers 43, 43a, 43b and 43c.

Additionally, the summing circuit 44 may be connected to receive the output signals of each of the channel decay circuits, thereby using only one modulator.

Figure 3D:
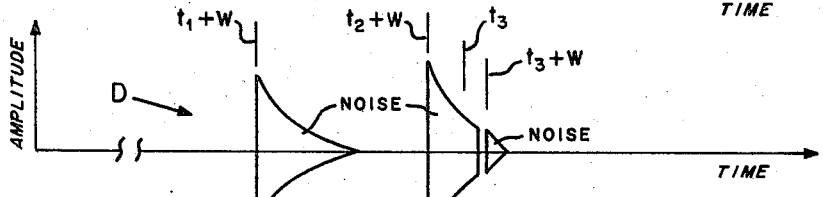

The output signal of modulator, waveform D of FIG. 3d, is applied to the summing network 45 along with the echo analogue signal. It is undesirable to superimpose the white noise directly upon the amplitude controlled pulses of waveform A, FIG. 3a. Therefore, the use of the current sensor 52 and the threshold detector 59 to inhibit the input of a modulator 46 enables superimposition of noise having an exponentially decaying envelope in the intervals between pulses. As soon as the capacitor 55 begins to charge, the sensor 52 inhibits the modulator 56 from providing an output signal. When the capacitor 55 has reached its maximum charge and begins to decay at the trailing end of the pulses, the inhibiting signal from the sensor 52 disappears, and the appropriately shaped pulses of noise are supplied to the summing network 45. No noise is added after the end of the last replica pulse because of the operation of the threshold detector 59.

Figure 3E:
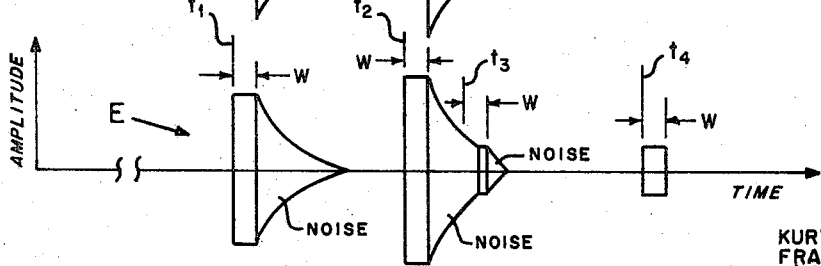

The output signal of summing network 45, waveform E of FIG. 3e, which is the echo analogue signal having superimposed noise is applied to a modulator 61 which receives an input signal from the variable oscillator 62. The frequency of the output signal of the oscillator 62 is selected to have a frequency which is the sum of the frequency $f_1$ plus the frequency of the desired Doppler shift in order to simulate moving target. The output signal of the modulator 61 having an up-shifted frequency band is applied through an amplifier 63 to the projector 22 for acoustic projection.

If the hydrophone 21 and the projector 22 are positioned at precisely the range $r_1$ at which the simulated target is to be arranged relative to the sonar system under test, it will be necessary to overcome the effects of acoustic feedback between the projector 22 and the hydrophone 21 since the projector 22 will begin projecting the received pulse as it is being received in those situations as shown in FIG. 1 wherein the first discontinuity produces a major reflection. Appropriate shaping of the azimuth beam patterns of the projector 22 and hydrophone 21 can greatly reduce the effect of feedback. Additionally, the apparatus 24 includes a feedback elimination circuit 70 whose function is to provide an electrical signal $\pi$ radians out of phase with the acoustic signal from the projector 22 being received by the hydrophone 21. The circuit 70 includes a delay device 71 connected to receive the output of the modulator 61 and designed to impose a delay equal in time to the time for an acoustic signal to propagate from the projector 22 to the hydrophone 21. Thereafter, the delayed echo analogue signal is applied to an amplifier 72 which introduces a phase shift of $\pi$ radians. The output signal of the amplifier 72 is applied through a potentiometer 73 to the other input of the summing network 33. The potentiometer 73 is adjusted so that the signal being applied to the summing device 33 has the same amplitude as does the acoustic feedback signal being received by the hydrophone 21 from the projector 22. It may be necessary to adjust the separation distance $d$ slightly in order to peak the system response.

In situations where the variable range delay 39 is being utilized and where the duration of the impinging sonar pulse is less than the additional delay imposed by the device 39, the echo analogue signal from the modulator 61 is applied by closing a normally open switch 80 to actuate a threshold responsive switch 81 whose function is to provide a control signal to the relay 31. The switch 80 is closed to enable the switch 81 and relay 31 to interrupt the transmission path from the hydrophone 21 to the amplifier 32 only when the delay 39 is being used.

One way to ascertain the appropriate settings for each of the potentiometers 42, 42a—42n, is to obtain actual echo returns from a real or model target having the desired aspect which is to be simulated and then to measure the relative amplitudes of the major reflections included in the echo. It is also possible to compute the relative target strengths of the component pieces of the target being simulated. Such a technique of establishing target strength for a cylinder is described by A. Freedman in "High Frequency Echo Structure of Some Simple Body Shapes" Vol. 12, No. 2 Acustica S. Hirzel Verlag, Stuttgart, Germany (1962) pp. 61—70, especially at 68 and 69.

From the above, it is apparent that the invention provides a most versatile device useful not only for training sonar operators but also for testing sonar apparatus. Of course, the apparent aspect of the target being simulated is altered by readjusting the delays imposed by the devices 41a—41n and by readjusting relative pulse amplitudes for changes in relative target strength. The apparatus enables simulation of moving targets and has a capability of apparent range variation. The processor 24 may be based on a platform such as a boat and the hydrophone 21 and projector 22 suspended therefrom at the desired depth. The platform may then be maneuvered in accordance with a desired pattern of movement of the target being simulated.

Obviously many modifications and variations of the present invention are possible in view of the above teachings. It is, therefore, to be understood that within the scope of the appended claims the invention may be practiced otherwise than as specifically described.

We claim:
1. A method of simulating the echo of a sonar pulse from an acoustic energy reflective target having reflection producing discontinuities positioned at different ranges along the path of the sonar pulse comprising the steps of:
   receiving the sonar pulse;
   delaying the sonar pulse received to provide at least one replica pulse displaced in time as a function of the difference in ranges of the discontinuities in the target along the pulse path;
   collecting the received pulse and the replica pulse to provide an echo analogue signal; and
   acoustically projecting the echo analogue signal.

2. A method according to claim 1 further comprising the step of attenuating both the received pulse and the replica pulse in accordance with the relative target strengths of the corresponding discontinuities.

3. A method according to claim 2 further comprising the step of adding white noise to the echo analogue signal during the interval between the received pulse and the replica pulse.

4. A method according to claim 2 further comprising the steps of:
   generating a fill-in noise envelope during the interval between the received pulse and the replica pulse;
   amplitude modulating white noise with the fill-in noise envelope; and
   summing the amplitude modulated white noise with the echo analogue signal.

5. A method according to claim 2 further comprising the steps of:
   modulating the received pulse to provide a received pulse having a down-shifted frequency band; and
   modulating the echo analogue signal to provide for projection of an echo analogue signal having an up-shifted frequency band corresponding to the sum of that of the received pulse and a selected shift attributable to the Doppler effect wherein the simulated target appears to be moving relative to a source of the sonar pulse.

6. A method according to claim 2 further comprising the steps of;
   providing a delayed image of the echo analogue signal shifted 180° in phase with respect to the projected echo analogue signal being received during said step of projecting; and
   summing the image signal with the received signal to provide a received pulse unaffected by acoustical feedback during said step of projecting.

7. Apparatus for simulating the sonar signal echo from a target of predetermined configuration comprising:
   hydrophone means for receiving a sonar signal and providing an input signal;
   processing means connected to said hydrophone means for receiving said input signal and providing an echo analogue signal having said input signal and at least one replica signal displaced from each other in time as a function of the range difference in reflection producing discontinuities of the target; and
   projector means connected to said processing means for receiving and for projecting said echo analogue signal.

8. Apparatus according to claim 7 wherein said processing means comprises:
   delay means connected to receive said input signal for providing a plurality of replica signals successively displaced in time;
   a plurality of amplitude control means each connected for receiving a respective one of said input and said replica signals, said control means adjusting the relative amplitudes of said input and said replica signals in accordance with the relative target strengths of discontinuities in the target; and
   summing means connected to said amplitude control means for receiving and summing said input and said replica signals for providing said echo analogue signal.

9. Apparatus according to claim 8 wherein said processing means further comprises means connected to receive said electrical echo analogue signal for providing to said projector means said electrical analogue signal having amplitude controlled noise superimposed thereon during the intervals between successive ones of said input and said replica signals.

10. Apparatus according to claim 7 wherein said processing means further comprises:
delay means connected for receiving said input signal and providing at least one replica signal delayed in time;
a plurality of attenuator means each connected for receiving and attenuating a respective one of said input signal and said replica signal; and
first summing means connected to said attenuator means for receiving and summing said input and said replica signals and for providing said echo analogue signal.

11. Apparatus according to claim 10 wherein said processing means further comprises superimposing means connected to receive said echo analogue signal for superimposing amplitude controlled noise on said echo analogue signal during the interval between said input and said replica signals and providing said analogue signal to said projector means.

12. Apparatus according to claim 11 wherein said superimposing means further comprises:
fill-in circuit means receiving said echo analogue signal for providing amplitude modulated noise during the interval between said input and said replica signals; and
second summing means connected to receive said echo analogue signal and said amplitude modulated noise for providing said echo analogue signal having superimposed noise to said projector means.

13. Apparatus according to claim 12 wherein said fill-in circuit means comprises:
envelope detector means connected to said first summing means for receiving said echo analogue signal and providing a DC output signal indicative of the envelope of said echo analogue signal;
decay means connected to receive said DC output signal for imposing an exponential decay of the trailing ends of pulses in said DC signal to provide a fill-in noise envelope signal;
generator means providing a white noise signal; and
modulator means connected to receive said white noise signal and said fill-in noise envelope signal for amplitude modulating said white noise signal and providing said amplitude modulated white noise signal.

14. Apparatus according to claim 13 wherein said fill-in circuit means further comprises:
said modulator means being responsive to an inhibit signal for providing no output signal; and
current direction sensing means interposed between said envelope detector and said decay means for providing said inhibit signal to said modulator during the occurrence of said input and replica signals in said echo analogue signal.

15. Apparatus according to claim 14 wherein said decay means comprises a resistor and a capacitor connected in parallel across the input of said modulator means.

16. Apparatus according to claim 15 wherein said fill-in circuit means further comprises:
threshold detector means connected to receive the last occurring replica signal for providing in response thereto an inhibit signal; and
OR gate means connected to receive said inhibit signals of said threshold detector means and said current direction sensor means for providing said inhibit signal to said modulator means.

17. Apparatus according to claim 10 wherein said processing means further comprises:
oscillator means for providing an oscillator output signal having a first frequency;
first modulator means connected to receive said oscillator output signal and being interposed between said hydrophone means and said delay means for providing said input signal having a down-shifted frequency band to said delay means;
variable oscillator means for providing a variable oscillator output signal having a frequency equal to the sum of said first frequency and a Doppler shift frequency; and
second modulator means interposed between said summing means and said projector means for providing said echo analogue signal having an up-shifted frequency band to said projector means.

18. Apparatus according to claim 17 wherein said processing means further comprises:
a bypass switch interposed between said first modulator means and said delay means; and
variable delay means connected to said bypass switch for imposing upon said input signal a time delay corresponding to a selected range difference.

19. Apparatus according to claim 18 wherein said processing means further comprises:
relay means interposed between said hydrophone means and said delay means for normally transmitting said input signal to said delay means and being responsive to a control signal for interrupting said transmission; and
threshold means connected to receive said echo analogue signal and being responsive thereto for providing said control signal to said relay means.

20. Apparatus according to claim 10 wherein said signal processor further comprises:
feedback elimination means connected to receive said echo analogue signal for providing a time delayed replica of said echo analogue signal shifted $\pi$ radians in phase; and
second summing means connected to receive and sum said echo analogue replica signal and said input signal from said hydrophone for providing to said delay means said input signal substantially free of the component contributed by said projected echo analogue signal.

21. Apparatus according to claim 20 wherein said feedback elimination means comprises:
second delay means connected to receive and delay said echo analogue signal a period of time which is a function of a separation distance between said hydrophone means and said projector means;
phase shift means connected to said second delay means for imposing a phase shift of $\pi$ radians upon said delayed echo analogue signal; and
attenuator means interconnecting said phase shift means and said second summing means for providing said echo analogue replica signal.